Figure 2:
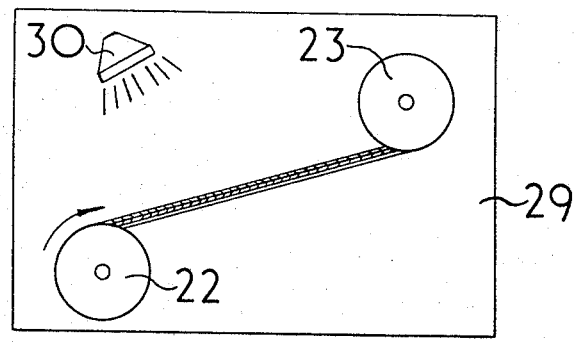

July 11, 1967   J. W. WATSON ET AL   3,330,713
METHOD OF COATING TEXTILE FABRICS
Filed Jan. 16, 1963

JOHN WILLIAM WATSON
JOHN ARTHUR SPITTLE
INVENTORS

BY Rauber & Lazar

THEIR ATTORNEYS

United States Patent Office 3,330,713
Patented July 11, 1967

3,330,713
METHOD OF COATING TEXTILE FABRICS
John William Watson and John Arthur Spittle, Sutton Coldfield, England, assignors to Dunlop Rubber Company Limited, London County, England, a British company
Filed Jan. 16, 1963, Ser. No. 251,729
Claims priority, application Great Britain, Jan. 30, 1962, 3,398/62
2 Claims. (Cl. 156—244)

This invention relates to a method of coating textile fabrics and to coated fabrics obtained by the method.

According to the present invention, the method of coating a textile fabric comprises applying a layer of curable, solvent-free, liquid polyurethane composition to a supporting surface, partially curing said composition, applying the textile fabric to be coated to the partially-cured film so obtained, completing the cure of said film, and releasing the cured film adhered to said fabric from said supporting surface.

The method of the present invention provides a convenient and easy way of providing a textile fabric with a coating of a cured polyurethane composition in which the degree of penetration of the polyurethane composition into the fabric can be easily controlled. The invention is particularly useful for providing an elastic fabric, and in this case the coating, while being strongly adherent to the fabric, should not interfere excessively with the relative movement of the yarns of the fabric, otherwise the fabric will not be able to stretch or contract. Therefore, the composition should be partially cured prior to application of the fabric to an extent so that the composition, while having a sufficient degree of tack to bond well to the fabric, has a plasticity or viscosity such that penetration into the fabric to any substantial extent is not possible.

The method of the invention can be used for coating textile fabrics with any liquid polyurethane composition which can be cross-linked to a solid polymer or an elastomer. The polyurethane composition which is used is first applied to a supporting surface to form a film, and to enable this to be easily effected, the composition should be liquid so that it can be extruded through an orifice of the required dimensions on to the surface. Usually, the surface will be moving so that a continuous film is deposited on it. The liquid polyurethane composition is mixed prior to extrusion on to the supporting surface with the appropriate curing agents when necessary, and with any other ingredients as may be desired such as pigments, antioxidants, and catalysts. The liquid polyurethane composition can be a mixture of an organic compound containing at least two groups each containing an active-hydrogen atom and an organic compound containing at least two terminal or substantially-terminal groups each containing an —NCX radical wherein X represents an atom of oxygen or sulphur, or it may be a polyurethane precursor, i.e. a prepolymer.

The organic compound containing at least two groups each containing an active-hydrogen atom is usually a polymeric compound such as a polyether, polythioether, polyester, polyesteramide or polyamide, and is preferably a polyether containing ether or thioether linkages and at least two —OH or —SH groups. The organic compound containing at least two terminal or substantially-terminal groups each containing an —NCX radical can be a polyisocyanate or polyisothiocyanate. The —NCX radical can be attached to an aliphatic, aromatic, or heterocyclic group.

In the case where the polyurethane composition is a mixture of an organic compound containing at least two groups each containing an active-hydrogen atom, and an organic compound containing at least two groups each containing an —NCX radical, then these reactants are mixed immediately prior to extrusion on to the supporting surface. In other words, this process is a "one-shot" process.

Preferably, the liquid polyurethane composition is based on a polyurethane precursor such as a liquid prepolymer obtained by reacting a polyether, polyester, polyesteramide, or polyamide with an organic polyisocyanate or polyisothiocyanate, to give a reaction product containing at least two terminal or substantially-terminal —NCX groups, wherein X represents an atom of oxygen or an atom of sulphur. A process for producing a typical composition based on a polyurethane prepolymer which can be used, is described and claimed in our co-pending application Serial No. 119,296, filed June 26, 1961. This application describes and claims a process for producing a polyurethane which comprises mixing under anhydrous or substantially-anhydrous conditions, a reaction product containing at least two terminal or substantially-terminal groups in the molecule, each group comprising an aliphatic radical containing an isocyanate substituent, with a polyol containing more than two —OH or —SH groups in the molecule and a catalyst to accelerate cross-linking in said reaction product. The reaction product described in this co-pending patent application can be produced by reacting a polymeric diol with an organic aliphatic polyisocyanate, but reaction products produced from aromatic polyisocyanates can also be used in the present invention. Generally, it will be necessary to mix the liquid polyurethane composition, when based on a polyurethane prepolymer, with a cross-linking agent and catalyst immediately prior to application to the supporting surface.

Cross-linking agents which can be used, depending on the nature of the liquid polyurethane compositions, are organic compounds containing active-hydrogen atoms such as polyols, e.g. triols, and polyamines.

The cross-linking agent is usually incorporated in the composition in an amount of 2 percent to 10 percent based on the weight of the liquid polyurethane composition.

Catalysts which can be used include (a) triethylene diamine and its homologues and analogues, and (b) esters, alkyl esters and salts of the metals of Groups IV, V and VI of the Periodic Table, especially those in the sub-group containing tin. A typical catalyst is dibutyl tin dilaurate. The catalyst is usually used in an amount of 0.05 percent to 0.5 percent based on the weight of the liquid polyurethane composition.

The liquid polyurethane composition supported on the supporting surface in the form of a film is then partially-cured and this can be effected, depending on the nature of polyurethane composition, at room temperature or at an elevated temperature. Preferably the composition is heated by passing it underneath infrared heaters but any other suitable means can be employed.

The supporting surface to which the liquid composition is applied should be such that it does not bond or adhere in any way to the polyurethane composition when this is finally cured, and may comprise for example, stainless steel or a substantially impervious material such as polytetrafluoroethylene, a polymer of vinyl chloride, a copolymer of vinyl chloride, polyethylene, or polypropylene, which is preferably impregnated with wax. Preferably, the supporting surface is a continuous belt or a long length of an easily-disposable material such as waxed paper which is easily separable from the cured polymer composition by heating. The wax should have a melting point greater than the temperature at which the polyurethane composition is cured. If the supporting surface is in the form of a conveyor belt, then preferably it should be of such a length as to permit curing of the composition to be effected before the belt reaches the limit of its travel in one direction, and it should also be formed of material which does not require heating to assist easy removal of the coated fabric.

When the liquid polyurethane composition is partially-cured, the textile fabric is applied to the surface of the film so obtained. This can be effected by passing the supporting surface carrying the film, and the textile material, between nip rollers which cause the partially-cured film and the fabric to adhere together. Any textile fabric can be used in the method of the invention and can be formed from natural or synthetic textile fibres such as wool, cotton, sisal, rayon, nylon, and terylene. The fabric can be woven fabric or can be a dimensionaly-unstable fabric, i.e. a knitted or weftless fabric such as that described in co-pending application of Gay et al. Serial No. 176.051, filed Feb. 27, 1962. Such a textile fabric is a mat which is formed by plying at least two separate layers of crimped fibres which have been collected under tension or alterntively, by collecting under tension preferably substantially-parallel crimped fibres to the desired depth which, upon relaxation, provides a mat of crimped fibres.

Alternatively, the mat may be obtained by drawing off a creel or beam an assembly of tensioned crimped fibres of desired depth which are then relaxed to provide the mat. In this latter method, the fibres may be drawn off two or more beams with the crimped fibres from one beam being superimposed upon the crimped fibres of another beam to give a desired depth of fibres. When the mat is formed from separate layers of crimped fibres, the general direction of the fibres of each layer may be generally parallel with, or at an angle to the general direction of the fibres in an adjacent layer or layers.

After the textile fabric has been applied to the film of partially-cured polyurethane composition, the composition is fully cured by further heating or by any other suitable means. When the curing has been completed, the film adhered to the fabric is then removed from the supporting surface. Depending on the nature of the supporting surface, this can be achieved by either heating the surface or simply removing the film by pulling. When the surface is formed from an impervious material, removal will be easy due to the fact that the film loses its tack upon complete curing.

The supporting surface can have a plain or embossed surface and when an embossed surface is employed, this will transfer the pattern to the surface of the film contacting it. The method of the present invention is particularly useful for the production of coated fabrics useful in the manufacture of a wide variety of articles such as flexible fuel containers, printers' blankets, tarpaulins, proofed-rainwear, petrol and oil diaphragms, and rubber sheet for beds. In particular, the method is of use in the manufacture of elastic textile fabric formed from a stretchable knitted fabric having a coating of an elastomeric polyurethane on one surface which is to be used in the manufacture of foundation garments such as girdles.

Figure 3:
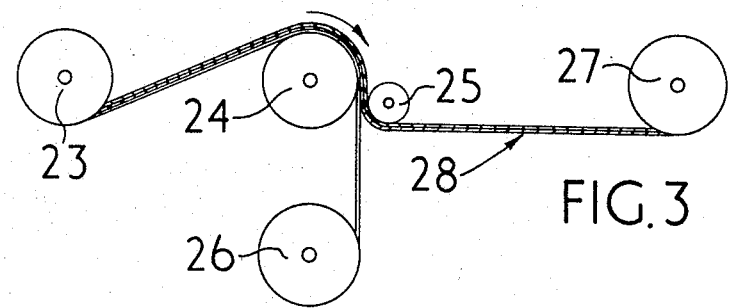
Figure 1:
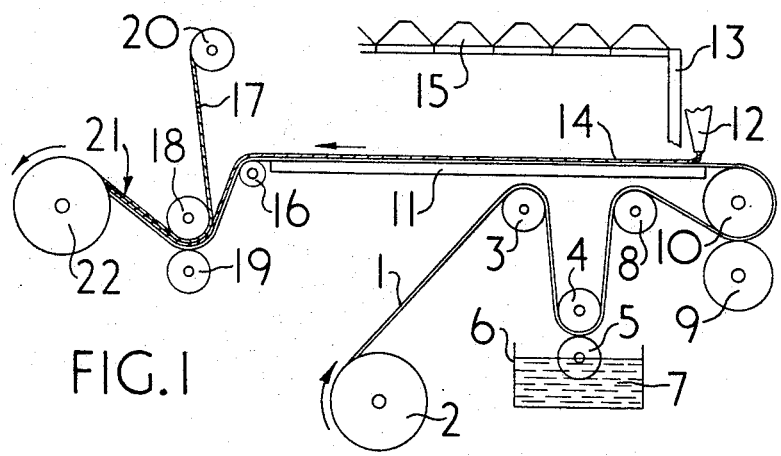

One form of apparatus suitable for the preparation of a coated textile fabric according to the present invention will now be described by way of example only and with reference to the accompanying drawing in which, FIG. 1 is a diagramamtic representation of an apparatus used to prepare a film of a partially-cured polyurethane composition and to apply a textile fabric thereto;

FIG. 2 is a diagrammatic representation of a curing oven used to effect final curing of the polyurethane composition in contact with the textile fabric; and FIG. 3 is a diagrammatic representation of a heated roller used to strip the polyurethane-coated fabric from the waxed paper.

As shown in FIGS. 1, 2, and 3 the apparatus consists of a batching roller 2 mounted to supply a support surface 11 with paper 1 via guide rollers 3, 4, 8 and 10. The guide roller 4 co-operates with a dip roller 5 which is partially immersed in molten wax 7 in a heated bath 6 and the guide roller 10 is mounted in such a position that its uppermost surface lies in the same horizontal plane as the support surface. The guide roller 10 is rubber covered and an embossing roller 9 co-operates with it.

An extruding head 12 is positioned above the support surface 11 close to the roller 10 and is shielded by a heat shield 13 from the heat of a bank 15 of infrared heaters which extends along a part of the length of the support surface and whose distance from the surface may be regulated. At the end of the support surface 11 which is remote from the roller 10 there is a jockey roller 16 which feeds the paper 1 from the support surface 11 between pinch rollers 18 and 19 and onto a batching roller 22. A second batching roller 20 loaded with textile fabric 17 is also positioned to feed batching roller 22 via the pinch rollers 18 and 19.

The curing oven 29 (FIG. 2) can be provided with two batching rollers 22 and 23 each of which is removable so that roller 23 may be positioned to feed material to a heated roller 24 (FIG. 3) which is mounted in contact with a guide roller 25 and in the proximity of two further batching rollers 26 and 27.

In the preparation of a coated textile fabric in accordance with the present invention, paper 1 is fed from the batching roller 2 and is coated with wax by the dip roller 5. The wax dries during passage of the paper between rollers 5 and 8 and the wax-coated paper is then embossed by the roller 9 during its passage around the roller 10.

From the roller 10 the waxed embossed paper passes onto the support surface 11 and is coated with an uncured polyurethane mix 14 from the extruder head 12. The polyurethane-coated waxed paper is thence passed beneath the bank 15 of infrared heaters where the polyurethane is partially cured.

From the support surface 11 the partially cured polyurethane film on the waxed paper is passed over the jockey roller 16 and between pinch rollers 18 and 19 where the partially-cured polyurethane surface is pressed against a textile fabric 17 supplied from the batching roller 20 to form a three-layered laminate 21 wherein the polyurethane is still only partially cured. This laminate is batched onto roller 22.

The roller 22 when full is removed and mounted in the curing oven 29 where the three layered laminate is passed slowly from the batching roller 22 to another batching roller 23 so exposing the fabric surface of the laminate to the infrared heater 30. The temperature of the curing oven is below the melting point of the wax and the rate of transfer of the laminate from one roller to the other is adjusted according to the time required to cure the polyurethane.

When the laminate has been completely passed onto the batching roller 23 the batching roller 23 is removed from the oven and mounted to feed the laminate to the heated roller 24 which is heated to a temperature above the melting point of the wax so that the wax is softened and the cured polyurethane-coated fabric 28 may be peeled off the paper around the guide roller 25 and batched onto the batching roller 27 whilst the paper is wound onto the batching roller 26.

The invention is illustrated in the following examples in which all parts are by weight:

*Example 1*

100 parts of a polytetramethylene ether glycol having a mean molecular weight of approximately 3000 were dehydrated by heating at 110° C. to 120° C. with stirring under reduced pressure in an atmosphere of pure nitrogen for 2 hours. The temperature was reduced to 100° C. and 26.25 parts of dicyclohexylmethane diisocyanate were added and the mixture was heated at 100° C. for 2 hours and then cooled. The polyurethane prepolymer so obtained was passed at 35° C. into a mixing head into which was also fed a mixture of a cross-linking agent and a catalyst, the amount of this mixture being 4.3 parts per 100 parts of prepolymer. The mixture of the cross-linking agent and the catalyst comprised trimethylol propane in an amount of 4.2 parts and dibutyl tin dilaurate in an amount of 0.1 part.

The mixed composition of prepolymer, catalyst and cross-linking agent which was in the form of a viscous syrup was delivered from the mixing head into a rectangular chamber having on its lower side, an orifice in the form of a slit 16 inches long and 0.004 inch wide. The mixed composition was extruded from this rectangular chamber as a film on to moving waxed paper. The paper was a standard sulphite tissue-paper 17 inches in width and weighing 0.29 ounce per linear yard, and prior to receiving the film of the mixed composition, it was coated by passing through a bath of molten synthetic wax of melting point 150° C. The weight of wax taken up was about 0.3 ounce per linear yard of paper.

The waxed paper was supported on a conveyor belt moving at a rate of 15 yards per minute and the composition was extruded on to the waxed paper at a rate of 558 cc. per minute so that the liquid film formed on the paper has the same dimensions as the orifice in the rectangular chamber.

The moving waxed paper carrying the liquid film was then passed under a bank of infra-red heaters 15 yards in length which raised the temperature of the liquid polyurethane prepolymer composition and maintained it at 140° C. for 1 minute, thereby bringing the composition to a soft, tacky state having the required degree of fluidity.

The paper carrying the partially-cured polyurethane prepolymer was then fed between nip rollers where the film was brought into contact with, and lightly pressed against a stretchable knitted fabric. The laminate so produced was then wound into a roll and the polyurethane prepolymer cured fully by heating in an oven at 120° C. for 15 minutes. When the polyurethane prepolymer was fully cured, the laminate was passed over a hot metal roller with the paper in contact with the roller, so causing the wax to melt and releasing the paper from the textile fabric polyurethane laminate.

The polyurethane coated textile fabric obtained in this example was eminently suitable for the manufacture of girdles and a wide variety of other article which are required to have elastic properties.

*Example II*

A prepolymer commercially available under the trade name Adiprene L.100 was degassed by heating at 100° C. for 20 minutes under reduced pressure and then cooled to 35° C. Adiprene L.100 is a substantially linear prepolymer with terminal isocyanate groups prepared from polytetramethylene ether glycol and tolylene diisocyanate.

The prepolymer was passed at 35° C. into a mixing head into which was also fed a mixture of cross-linking agent and catalyst, the amount of this mixture being 4.15 parts per 100 parts of prepolymer. The mixture of the cross-linking agent and catalyst comprised hexane triol in an amount of 2.67 parts, trimethylol propane in an amount of 1.33 parts and stannous octoate in an amount of 0.15 part.

The mixed composition was spread on to the waxed paper as described in Example I except the paper and conveyor belt were moving at 2 yards per minute and the extrusion rate was 76 cc./minute.

The moving waxed paper carrying the liquid film was then passed under a bank of infra-red heaters 15 yards in length which raised the temperature of the liquid polyurethane prepolymer composition and maintained it at 80° C. for 7½ minutes, thereby bringing the composition to a soft, tacky state having the required degree of fluidity.

The paper carrying the partially-cured polyurethane prepolymer was then fed between nip rollers where the film was brought into contact with, and lightly pressed against a stretchable knitted fabric. The laminate so produced was then wound into a roll and the polyurethane prepolymer cured fully by heating at 100° C. for 1 hour.

The laminate was then released from the paper as described in Example I.

*Example III*

100 parts of a polyester available under the trade name Desmophen 2001 were dehydrated by heating at 110° C. to 120° C. with stirring under reduced pressure in an atmosphere of pure nitrogen for 2 hours. Desmophen 2001 is a linear polyester prepared from adipic acid and a mixture of diols.

The temperature was reduced to 100° C. and 25.2 parts of hexamethylene diisocyanate were added and the mixture was heated at 100° C. for 2 hours and then cooled. The polyurethane prepolymer so obtained was passed at 35° C. into a mixing head into which was also fed a mixture of cross-linking agent and a catalyst, the amount of the mixture being 7.22 parts per 100 parts of prepolymer. The mixture of the cross-linking agent and the catalyst comprised hexane triol in an amount of 4.65 parts, trimethylol propane in an amount of 2.32 parts, and stannous octoate in an amount of 0.25 part.

The mixed composition was spread on to the waxed paper as described in Example I.

The moving waxed paper carrying the liquid film was then passed under a bank of infra-red heaters 15 yards in length which raised the temperature of the liquid polyurethane to 120° C. for 7½ minutes, thereby bringing the composition to a soft, tacky state having the required degree of fluidity.

The laminate was then formed, cured, and released from the waxed paper as described in Example I.

Having now described our invention, what we claim is:

1. A method of coating a textile fabric which comprises mixing together a prepolymer formed by reacting a polyether containing linkates of the class comprising ether linkates and thioether linkates with an aliphatic diisocyanate, a cross-linking agent and a catalyst to promote cross-linking of the polyurethane composition so formed, extruding said polyurethane composition through an orifice onto a moving sheet of paper coated with a layer of wax to form a layer of said polyurethane composition on said layer of wax, exposing said moving layer of polyurethane composition to infra-red radiation to effect partial curing of said composition, passing the partially cured film so obtained into contact with a textile fabric to be coated and through the nip of roller surfaces to attach said textile fabric to the surface of the partially cured film, thereafter exposing the passing assembly so formed to infra-red radiation to complete the cure of said film, and passing said assembly over a heated surface with the paper in contact with said surface to cause the wax to melt and release the cured film attached to said textile fabric.

2. A method of coating a textile fabric which comprises mixing together a prepolymer formed by reacting a polymer of the class consisting of polyethers and polyesters containing linkates comprising ether linkates, thioether linkates and ester linkates with a diisocyanate of the class consisting of aromatic diisocyanates and aliphatic diisocyanates, a cross-linking agent and a catalyst to promote cross-linking of the polyurethane composition so formed, extruding said polyurethane composition through an orifice onto a moving sheet of paper coated with a layer of wax to form a layer of said polyurethane composition on said layer of wax, exposing said moving layer of polyurethane composition to infra-red radiation to effect partial curing of said composition, passing the partially cured film so obtained into contact with a textile fabric to be coated and through the nip of roller surfaces to attach said textile fabric to the surface of the partially cured film, thereafter exposing the passing assembly so formed to infra-red radiation to complete the cure of said film, and passing said assembly over a heated surface with the paper in contact with said surface to cause the wax to melt and release the cured film attached to said textile fabric.

References Cited

UNITED STATES PATENTS

| | | | |
|---|---|---|---|
| 2,172,466 | 9/1939 | Edwardes et al. | 264—225 |
| 3,046,177 | 7/1962 | Hankins | 156—246 X |
| 3,077,428 | 2/1963 | Heuser et al. | 156—244 X |
| 3,124,212 | 3/1964 | Stephens | 156—246 X |
| 3,218,212 | 11/1965 | Underwood | 156—244 |
| 3,240,655 | 3/1966 | Voelker | 156—247 X |
| 3,257,252 | 6/1966 | Keel | 156—247 X |
| 3,282,765 | 11/1966 | Pine et al. | 156—247 X |

EARL M. BERGERT, *Primary Examiner.*

HAROLD ANSHER, *Examiner.*